(12) United States Patent
Goss et al.

(10) Patent No.: US 11,609,952 B1
(45) Date of Patent: Mar. 21, 2023

(54) UTILITY BASED INQUIRY SELECTION IN A STREAMING DATA PIPELINE

(71) Applicant: ZeetoGroup, LLC, San Diego, CA (US)

(72) Inventors: Stephan Goss, San Diego, CA (US); Marcie Gately, San Diego, CA (US); Laura D Gonzalez, San Diego, CA (US); Herbert Johnson, El Cajon, CA (US); Matthew William Maybeno, San Diego, CA (US); Alexander James Egan, San Diego, CA (US); Matt Ferguson, Ramona, CA (US)

(73) Assignee: ZEETOGROUP, LLC, San Diego, CA (US)

( * ) Notice: Subject to any disclaimer, the term of this patent is extended or adjusted under 35 U.S.C. 154(b) by 24 days.

(21) Appl. No.: 16/001,545

(22) Filed: Jun. 6, 2018

(51) Int. Cl.
G06F 16/951 (2019.01)
G06F 16/9032 (2019.01)
G06Q 30/0242 (2023.01)
G06F 16/903 (2019.01)

(52) U.S. Cl.
CPC .. *G06F 16/90332* (2019.01); *G06F 16/90335* (2019.01); *G06F 16/951* (2019.01); *G06Q 30/0242* (2013.01)

(58) Field of Classification Search
CPC ......... G06F 16/90332; G06F 16/90335; G06F 16/951; G06Q 30/0242
See application file for complete search history.

(56) References Cited

U.S. PATENT DOCUMENTS

| 6,480,881 | B1 * | 11/2002 | Kubota | H04L 41/046 709/202 |
| 2013/0085859 | A1 * | 4/2013 | Sim | G06Q 30/02 705/14.58 |
| 2017/0085962 | A1 * | 3/2017 | Maughan | H04N 21/812 |
| 2018/0101771 | A1 * | 4/2018 | Schwarm | G06N 7/005 |

* cited by examiner

*Primary Examiner* — Hosain T Alam
*Assistant Examiner* — Chongsuh Park
(74) *Attorney, Agent, or Firm* — Amin, Turocy & Watson, LLP

(57) ABSTRACT

Systems and methods disclosed herein relate to utility based selection of inquiries in a streaming data pipeline. An indication of user identification data and a data source may be received by a server in communication with a distributed streaming data pipeline. This pipeline may be in communication with asynchronous event processing services. Those event processing services may determine an inquiry rule that includes an inquiry threshold. This rule may be based on the data source and retrieval of information related to that data source from memory in a database server. The rule may prompt a comparison of an inquiry count to an inquiry threshold. If the count is below the threshold, an inquiry may be sent to a user based in part upon expected utility that is itself based upon several indications of expected utility calculated by an event processing service.

20 Claims, 16 Drawing Sheets

| @zeeto | Fashion Pros INC. ▾ | Campaigns | Reports | Admin | Jane@fashionpro.com ▾ |

Add Targeting

Customize Network

Targeted Properties\*  Choose which properties you are interested in targeting. Only properties set to "include" on the network tab are available.

Pete's Wardrobe
Daily Style INC.

[ Manage Properties ]

Would you like to bid different amounts for placements within each property?
◉ Yes
○ No

⎬ 610

Demographic

Age\*  Do you want to show your campaigns to visitors of all ages?
○ Show it to everyone
◉ Only show it to visitors in a specific age group

[ is Greater Than or Equal to ▾ ]  [ 18 ]

Do you want to bid different amounts depending on a visitor's age?
○ Yes
◉ No

Do you also want to show your campaign to visitors whose age was not specified? (Displays your ad, even if publisher does not collect age)
○ Yes
◉ No Gender\*  Do you want to show your campaign to only men or women?
◉ Show it to everyone
○ Only show it to men
○ Only show it to women Do you want to bid different amounts depending on a visitor's gender?
◉ Yes
○ No

Location* Do you want to show your campaign to all visitors regardless of their location?
- ◉ Show it to everyone
- ○ Only show it to visitors in specific locations
- ○ Do not show it to visitors in specific locations Device* Do you want to show your campaign to visitors using specific devices?
- ○ Show it on all devices
- ◉ Only show it on specific devices Which devices would you like to show your campaign on? {Select all that apply}
- ☐ Dekstop
- ☑ Mobile
- ☐ Tablet
- ☐ In App
- ☐ Other ⓘ

Email Service Provider* Do you want to show your campaign to visitors based off their email service provider?
- ◉ Show it to everyone
- ○ Only show it to visitors in specific email service providers
- ○ Do not show it to visitors in specific email service providers

Visitor Attribute

Choose Attribute* Target visitors based on the attributes they gain when answering our smart questions....

| ACA Insurance |
| Arthritis |
| Auto Insurance |
| No Auto Insurance |
| Back Pain |
| Beauty |
| Cooks |
| Diabetes |
| Dishing out |
| Financial Investing |
| Financial Planning |
| Foodie |

Group 1
*Does attribute with an 'OR' exclusive hours*

| Fashion |
| Shopping Deals |
| Attribute 2 |

☑ Bid different amounts on group attributes.

[ Add New "OR Group" ]

You're Targeting *Fashion OR Shopping Deals*

630

Using OR vs AND Groups

OR Groups
If you drag attributes "OR" relationship, this will show your ad to visitors that match either of the attributes grouped....

AND Groups
If you use two "OR" groups you create an "AND" relationship between the grouped attributes....

*required  [Save] [Cancel]

© Copyright 2013 - 2016 Zeeto. All rights Reserved.
Privacy Policy | Contact Us

FIG. 6C

| | Property | Placement | Target | Current Status | Current Bid | Current Daily Limit |
|---|---|---|---|---|---|---|
| | Totals | | | | | |
| ☐ | Pete's Wardrobe | Registration Page | Age >18, Male, Mobile, Fashion | ● Active ▽ | $ 0.50 | $ Optional |
| ☐ | Pete's Wardrobe | Registration Page | Age >18, Female, Mobile, Fashion | ‖ Paused ▽ | $ 2.50 | $ Optional |
| ☐ | Pete's Wardrobe | Registration Page | Age >18, Male, Mobile, Shopping Deals | ● Active ▽ | $ .20 | $ 5,000.00 |
| ☐ | Pete's Wardrobe | Registration Page | Age >18, Female, Mobile, Shopping Deals | ‖ Paused ▽ | $ 0.00 | $ Optional |
| ☐ | Pete's Wardrobe | Newsletter Signup | Age >18, Male, Mobile, Fashion | ‖ Paused ▽ | $ 0.00 | $ Optional |
| | ⋯ | ⋯ | ⋯ | ⋯ | ⋯ | ⋯ |

FIG. 7A

| | Campaigns | Reports | Admin | Jane@fashionpro.com ▽ |
|---|---|---|---|---|

Today, Jan 08, 2018 ▽

| Cost ⬥ | Impr ⬥ | Opt-In % ⬥ | Billable Leads ⬥ | Cost per Billable Lead ⬥ | Accepted Lead% ⬥ | Accepted Leads ⬥ | Cost per Accepted Lead ⬥ | eCPM ⬥ |
|---|---|---|---|---|---|---|---|---|
| $84,907.85 | 121,209 | 76.62% | 92,874 | $0.91 | 98.63% | 91,602 | $0.93 | $700.51 |
| $5,000.00 | 10,562 | 94.67% | 10,000 | $0.50 | 99.87% | 9,987 | $0.50 | $473.40 |
| $8,694.75 | 4,062 | 85.62% | 3,478 | $2.50 | 99.51% | 3,461 | $2.51 | $2,140.51 |
| $1,896.80 | 18,692 | 50.73% | 9,484 | $0.20 | 99.90% | 9,475 | $0.20 | $101.48 |
| : | : | : | : | : | : | : | : | : |
| : | : | : | : | : | : | : | : | : |
| ... | ... | ... | ... | ... | ... | ... | ... | ... |

FIG. 7B

| @zeeto | Modern Couture Co.▽ | Properties | Placements | Reports | Admin | john@modcouture.com ▽ |

Add Monetization

Settings

You control your money making strategy and visitor experience from the maximum number of questions asked, to what type of campaigns you'll allow on your placement. The name and description will not be visible to advertisers. Choose a name that's recognizable when running multiple monetizations at once. This will help you while split testing. } — 810

Name* [Moderate]

Description* [In this strategy we want to conservatively monetize our visitors with 8 questions only.]

Visitor Experience

Question* What is the maximum number of questions your visitors can be asked? It is recommended to start with between 5 to 15 questions.

[8 ▽]

Skip behavior* Do you want to allow your visitors to skip a question?
  ● No, don't allow them to skip
     (recommended for higher RPV)
  ○ Yes, they can skip questions eCPM What is the minimum eCPM a campaign must meet inorder to be shown on your placement? if there aren't any campaigns that meet this threshold the visitor's experience will end. } — 820

*Tip: The Lower the eCPM value the more money you can potentially make. On the other hand, a higher minimum eCPM value will give your visitors a better experience with higher quality advertisements but your potential for higher revenue will decrease.*

Campaign Types

Select Campaign*   Choose which campaign types you're interested in showing your visitors. The more types you allow the more money you could make. Make sure you're able to pass the required visitor attributes for the following campaign types.

| Campaign Types | Required Visitor Attributes | Approved | Preview |
|---|---|---|---|
| Simple Opt-in Email | Email | | View Sample |
| Simple Opt-in Phone | First Name | | View Sample |
| Link Out | None | | View Sample |

— 830

Campaign Limits   Here you can set the maximum number of times a visitor can see or convert on a campaign type in a single visit.

| Campaign Types | Maximum Impressions | Maximum Conversions |
|---|---|---|
| Simple Opt-in Email | 8 | 6 |
| Simple Opt-in Phone | 4 | 4 |
| Link Out | - Select - | - Select - |

— 840

*required   [Save] [Cancel]

© Copyright 2013 - 2016 Zeeto. All rights Reserved.
Privacy Policy | Contact Us

FIG. 8B

Settings

| | |
|---|---|
| Campaign Name* | Savvy Personal Stylist |
| Rate Type* | CPL ▽ |
| Vertical* | Retail ▽ ○ |

[Add Another]

Primary Contact Info — Select the primary way you will contact visitors.
☐ Email (Newsletter, Direct Email)
☐ Phone (Call Center)
☑ Physical Address (Direct Mail)

☑ Visitor Name

You must collect at least one primary contact method before Visitor Name is available

⎬ 910

Visitor Rules

Impression Limit — Set the maximum number of times you would like each visitor to see your campaign.
● No Limit
○ Once Every [ ] Day(s)

Conversion Limit — Set how times a visitor can convert on your campaign.
○ No Limit
○ Once Per Lifetime
● Once Every [30] Day(s)

Verification — Select below if you require visitor emails to be verified by a 3rd party before you will accept them as a lead.
☑ Email (BriteVerify)

⎬ 920

Budget

Budget Type  ● I Have a Budget   ○ I Have Unlimited Spend
☐ Daily*     $ 1,500,000.00
☐ Monthly    $ 0.00
☐ Lifetime   $ 0.00

☑ Hourly     $ 25,000.00

Setting an hourly cap will help distribute your leads more evenly over your daily or monthly budget.

Schedule

Start Date begins at 12:01 AM and End Date runs through 11:59 PM of selected dates. All times displayed are based on account Time Zone settings. This Account is currently set to America/Los Angeles.

Start Date [01/08/2018]
End Date [Date]
Day and Time ○ All Day/Every Day  ● Custom Days and Times

|  | 12am | 3am | 6am | 9am | 12pm | 3pm | 6pm | 9pm |

Monday
Tuesday
Wednesday
Thursday
Friday
Saturday
Sunday

■ Active  □ Pause

⟩ 940

Actions

Status [◯⬤] Time out! Your campaign is paused.
Delete Campaign [Delete Campaign]

⟩ 950

*required  [Save]

©Copyright 2013 - 2016 Zeeto. All rights Reserved.
Privacy Policy | Contact Us

FIG. 9B

UTILITY BASED INQUIRY SELECTION IN A STREAMING DATA PIPELINE

TECHNICAL FIELD

This application relates to selections of inquiries based upon a determination of utility, and more particularly to implementation of such features using a streaming data pipeline in communication with asynchronous event processing services.

BACKGROUND

The digital marketing industry uses various types of data to determine the best manner to provide advertising to and to gather information from various users. This data may include a user's age, ethnicity, income, location and other easily observable or collectable data.

Some companies create focused websites to drive users into their sites for collection of data and sales of advertising without using the inventive features taught below.

The prior art data collection methods collect or generate generally applicable user data, but often lack the ability to collect or generate specifically targeted data. Without such data, determining the utility behind providing a user with a particular opportunity or collecting further information from the user may provide a less accurate result. For example, if the prior methods are not able to determine whether a user has a particular disease or condition, then such methods cannot determine the utility associated with determining whether the user may wish to treat the disease/condition. And if the methods cannot determine either the presence of the disease/condition or the desire to treat the disease/condition, then the methods cannot determine the utility associated with determining whether a user prefers a daily pill or weekly injection as a treatment method. Hypothetically, a skin disorder may be present in some subset of the population and utility may exist in determining whether the population having the disorder is interested in treating the skin disorder. Extending the hypothetical, if the skin disorder can be treated either by taking a pill daily or by giving oneself a weekly injection, utility may exist in determining what portion of the population and/or which specific user having the disorder would prefer the weekly injection as opposed to the daily pill. Competing with this, utility may be found in determining other features, issues, preferences, or desires with respect to the same user. For example, utility may be present in determining whether the user desires to vacation in sunny locations. And the utility of obtaining such information may change after determining whether the user suffers from the skin disorder. However the user may have a tolerance for only providing a limited set of information. So after determining that the user has the skin disorder, it may be necessary to determine whether a greater utility exists in gathering information regarding treatment preferences versus vacation preferences. The known prior art systems do not adequately handle this determination in a manner that increases overall utility.

BRIEF DESCRIPTION OF THE DRAWINGS

FIGS. 6A, 6B, and 6C illustrate an exemplary layout for capturing information related to the publishers which an advertiser wishes to target;

FIGS. 7A and 7B illustrate an exemplary layout for capturing bids and providing statistics related to bids;

FIGS. 8A and 8B illustrate an exemplary layout for capturing and editing publisher settings;

FIGS. 9A and 9B illustrate an exemplary layout for capturing and editing campaign settings;

DETAILED DESCRIPTION

Figure 1A:
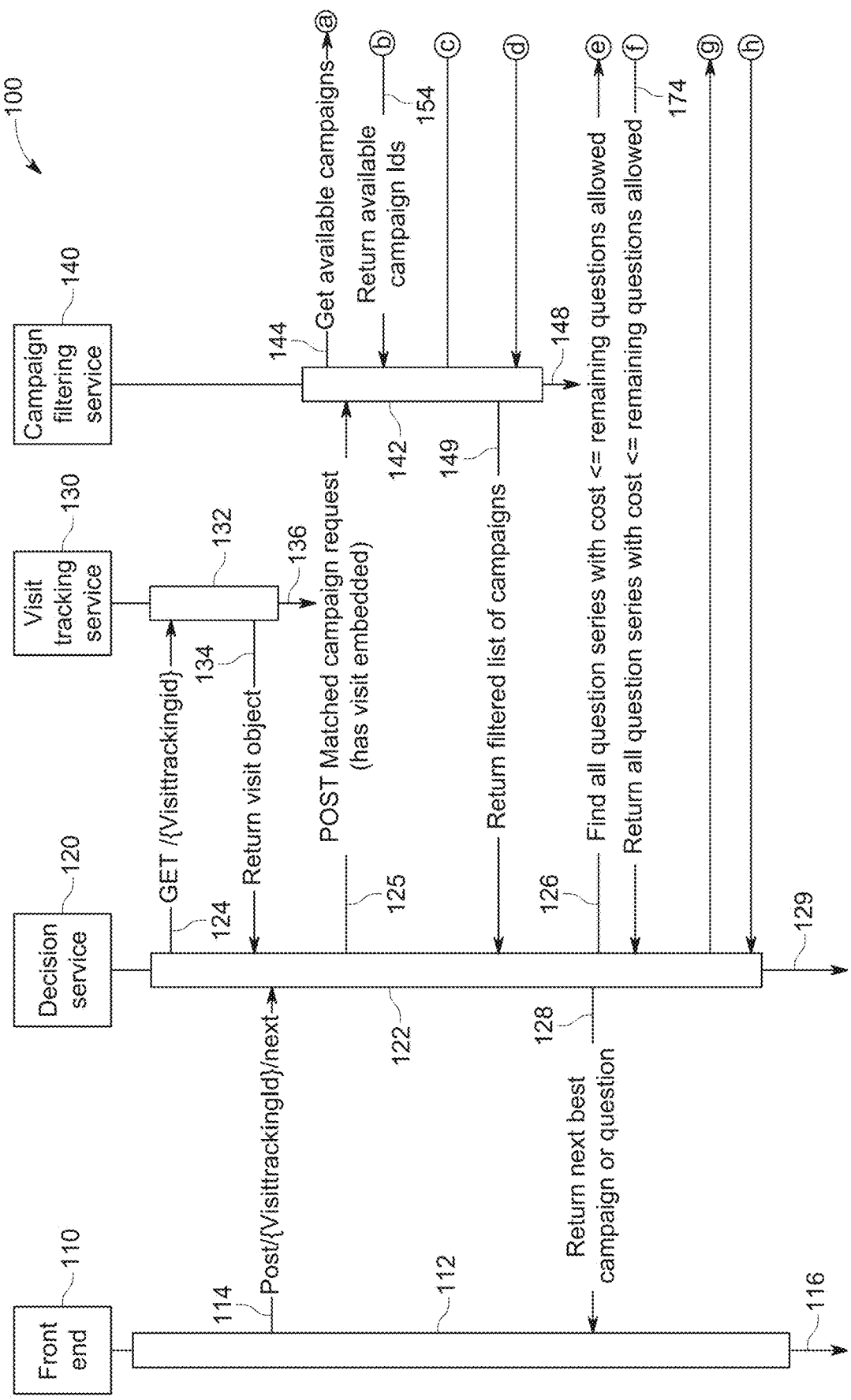
FIGS. 1A and 1B illustrate an example flow diagram for implementing and using the inventive system and method.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form to facilitate describing the various embodiments.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

Rather than relating to standard data collection as indicated in the background section, the invention permits the collection and use of new classes of data and inventive methods of collecting such data. Rather than being tied to standard demographic information, the inventive method relates to both the collection of data regarding historically non-observable information about a user that may relate to desires or interests of the user that cannot necessarily be determined based upon traditional data collection methods. For example, the invention may permit collection of data regarding a user's favorite color, preferences for pet ownership, interest in a particular type of automobile, motivation to change service providers for a service being consumed, interest in obtaining further education, etc.

The invention employs an intelligent decision engine including appropriate algorithms and models in a technical environment that increases processing speed and decreases processing time to retain a larger percentage of users through the data collection process. The inventive system and method may include a data discovery platform that may be Internet-based and that permits dynamic service of inquiries to users, for example, website visitors and mobile application users, in an attempt to find data. Collected data may then be used to deliver a user experience, product, or service. One such user experience may be an additional inquiry. Another such user experience may be an advertisement or advertising campaign. Many types of user experience may be delivered without departing from the scope of the inventive system.

In many embodiments of the inventive system, it is anticipated that four primary groups of actors are involved. These groups include publishers, advertisers, users, and an implementer of the inventive system. While applicants do not wish to define these terms narrowly, it is anticipated that each group will generally include at least the following attributes.

A publisher may be an operator of a content delivery system or network in which a user experience that is anticipated to primarily be a visual, audio, or audio-visual experience may be delivered. Publishers may include website operators, application developers, or other entities that deliver content to users of computers or other audio-visual devices. In the inventive system, a publisher may set the maximum number of user experiences (e.g., inquiries, questions, advertisements, videos, music, etc.) that may be delivered to a user through the inventive system. A publisher may also control the maximum number of questions asked to a particular user within a particular time period and the maximum number of times that a particular user may convert on a specific campaign provided by an advertiser. Importantly, a publisher provides a content delivery platform (e.g., a website or application) into which a user experience provided by the inventive system and method may be placed.

An advertiser may be an entity providing a user experience such as a banner advertisement, advertising video, advertising campaign, etc. Advertisements may include, for example, banner advertisements, lead generation, video, audio, cookie placements, mobile-based advertisements, advertisements for devices without screens (such as certain smart home devices), etc. An advertiser may desire to collect particular information from a user. An advertiser may specify that a user experience can be provided to particular user only after determining that the user has certain characteristics or after the user has indicated particular responses to posed questions. An advertiser may specify sets of attributes for which the advertiser determines that there is a particular utility in providing user experiences to users with the attributes. In such instances, the advertiser may provide a bid in which the advertiser agrees to provide or transfer the identified utility to an implementer of the inventive system and method in exchange for exposing the user to the advertiser's user experience.

The entity implementing the inventive system and method may be an advertiser or publisher, but preferably is in a different category and is able to act as an intermediary between advertiser and publisher. Preferably this entity will operate a specialized computer server system that provides the functionality identified herein and which interfaces or communicates with the computer systems of the publisher, advertiser, and user.

A user may be an entity that preferably seeks a particular type of content delivery from a publisher and to which a user experience is provided as part of the delivery of the desired content.

In a simplified explanation of a portion of one embodiment of the invention, an advertiser may want to indicate that the advertiser desires to deliver its visual and/or audio advertising to users who prefer the color purple. This indication may take the form of a bid indicating that delivering such advertising has a set amount of utility to the advertiser and that the advertiser will surrender such amount of utility to the party who delivers the advertising to the user. (In other instances, the advertiser may indicate that utility is derived from acts other than delivering advertising, for example, receiving a user input indicating interest or receiving an indication that the user has completed a goal set by the advertiser.) The inventive system may capture the amount of such utility, reduce such utility by the conversion rate of the campaign in which the advertising exists, reduce the resulting amount by the answer rate for a question designed to elicit the preference for the color purple (wherein the answer rate is the likelihood that a user may answer a question in a manner in which it is possible to determine that the user prefers the color purple), reduce the resulting number again by a percentage indicating the manner in which the party implementing the inventive system and a party displaying the advertising to the user may divide the received utility where the percentage may vary based on whether the advertiser has a preexisting relationship with the publisher, and thereafter reducing the resulting amount by a drop-off rate.

In a system wherein multiple types of user experiences are offered, multiple drop-off rates may be encountered. One exemplary user experience may be a simple opt-in advertising campaign wherein the user may be presented, for example, with an advertisement posing a yes/no question, such as "would you like to save 15% on car insurance?" In a simple opt-in situation, opting-in to that campaign will result in a recorded campaign conversion but will not result in directing the user away from the user experience. Rather, the user could then progress to the next experience in sequence. Users presented with this type of user experience typically have a low drop-off rate. In the alternative, a user experience may be a banner advertisement that directs the user to a different website or otherwise directs the user away from the user experience when selected by the user. Such user experiences have a very high drop-off rate. The expected utility to be gained by providing such an experience is reduced based upon this drop-off rate.

For example, a user may be presented with many types of user experience. These user experiences may include inquiries (such as a yes/no, multiple choice, or other form of question), a banner advertisement, a video advertisement, etc. When presented with a simple opt-in campaign, statistics show that a user is often likely to answer the question at a higher rate and continue through the user experience at a higher rate than when a user is presented with a banner advertisement which may derail the user from the user experience by sending the user into a different experience after clicking on a banner advertisement. Accordingly, banner advertisements typically have higher drop-off rates than yes/no questions.

While each type of campaign has a drop-off rate range, many are lower than the drop-off rates for banner advertising. Thus, based on the calculations performed to determine the expected utility from providing a particular user experience, it is very unlikely that a banner advertisement will be shown in the early portions of the user experience. Achieving this result may be possible by seeding a banner advertisement with a high drop-off rate before it has been presented enough times for the inventive system to have calculated its actual drop-off rate. For example, if the number of permitted inquiries is ten (10), and there is a new banner advertisement available in the inventive system, the inventive system may seed a high drop-off rate into the calculation of expected utility for that banner advertisement for the first eight (8) inquiries so that it is unlikely that the banner advertisement would be shown in the first eight (8) inquiries. Once a campaign has reached a volume of activity that allows the inventive system to calculate an accurate drop-off rate, the system will use the calculated metric and not the seeded value anymore. In systems that do not employ drop-off rate, it is likely that a user experience with a high drop-off rate may be presented in an initial inquiry due to its high utility. But doing so will often reduce the overall utility to be gained through the method because a user is likely to drop-off when presented with such an experience. Thus, it is preferable to employ a drop-off rate that will account for the desire to avoid users dropping off of the user experience. Such a rate may be a pre-set default for new campaigns, may be based on drop-off statistics, may be optimized to increase utility to the publisher, or may be determined in another manner. It is preferable, for advertising objects that have not had significant volume, to initially use the object with a pre-set default rate and record drop-off statistics for the object. After an object has been used in a desirable number of instances, a more accurate drop-off rate may be statistically established. In such instances, if the drop-off rate for a banner advertisement was sufficiently low, such an advertisement may be shown as one of the early inquiries.

In certain embodiments of the invention, it may be desirable to perform a deeper analysis based upon drop-off rate before providing further user experiences. For example, a banner advertisement or other type of campaign that links-out of the user experience may present the highest utility at a particular point in the sequence of inquiries, yet have a high drop-off rate. In such instances, it may be desirable to perform a deeper drop-off-related analysis before presenting the user experience to the user. Such analysis can include the system considering the number of inquiries permitted minus the number of inquiries already used. Then based upon the remaining number inquiries permitted, the system may determine either all or a subset of potential campaigns that the user may qualify for within the remaining number of inquiries. The system may then perform an analysis of the answer rate for the questions or other experiences that are needed to gain the attributes required for these campaigns. The system may also consider the conversion rate of these campaigns. Based on this, the system may determine the estimated utility of the remainder of the user experience based on the campaigns that may be presented to the user throughout all or some remaining portion of the user experience. The system may compare that expected utility to the utility of the campaign that has a high drop-off rate, in an effort to determine whether the utility of the single campaign having the high drop-off rate is greater than the expected utility of other campaigns for which the user qualifies. A decision may be made based on the comparison, and the user may be presented with the experience that represents the higher utility. This analysis may be performed at each successive step of the user experience in an attempt to obtain a higher overall utility related to the user's visit.

Answer rate considers the likelihood of a particular answer to a question. It may be desirable to alter the questions that are used so that the quality of the answer is more important than the number of clicks. In one example of using answer rate, if 12% of a population of users has diabetes, the likelihood that a user would answer a question in a manner confirming that the user has diabetes is expected to be 12%. The actual answer rate will be calculated based on users' answers to that inquiry. For inquiries designed to elicit one of multiple answers, each answer may have its own answer rate. For example, in a question having answers A, B and C, the answer rates may be 70% for answer A, 20% for answer B, and 10% for answer C. The inventive system and method may take such answer rates into account in determining the user experience. Similarly, if different user experiences present alternative ways of gathering the same information, e.g., different inquiries, each of the alternative experiences may have different answer rates that get to the same answer. In such cases, the inventive method and system can factor in the alternative answer rates in determining the appropriate user experience to present. If a particular question or inquiry has not been presented to users often enough to determine an actual or projected answer rate, the system may be seeded with an initial answer rate that may persist until sufficient data has been gathered to prepare an actual answer rate.

In addition to the factors identified above, the inventive method contemplates the use of additional factors that may assist in appropriately determining the utility to be gained by presenting a user with a particular user experience. For example, factors such as the number of times that a user experience may be presented to a user and the number of times that a user can convert in a particular user experience may also be taken into account.

With respect to dividing the received utility, an advertiser may provide an amount of utility to the party implementing the inventive system through a publisher. In such a case, the implementing party may retain a first portion of the utility and provide a second portion of the utility to the publisher. However, in the case where the advertiser has a pre-existing relationship with the publisher, the implementing party may retain a smaller share of the utility and provide a larger share of the utility to the publisher.

Such indications of utility may take any form indicating a measure of preferences for one set of goods and services versus another set of goods and services. Utility may take a financial form, indicating an individual's price for an asset. This price may be measured in goods, commodities, money or currency, or other measures of value.

As indicated above, in certain embodiments of the invention, the following factors may be used as metrics to determine the desirability of providing a particular inquiry or user experience:

a. Amount of utility bid by an advertiser
b. Answer rate for an inquiry wherein, for example, each answer to each inquiry may have its own expected rate of being chosen and the inventive system may use the likelihood of obtaining the desired answer
c. Conversion rate for an advertising campaign or user experience
d. Maximum permitted number of inquiries that may be presented to a user minus the number of inquiries that have already been presented to the user
e. Maximum number of times that a particular user experience (e.g., an advertising campaign) may be presented to a user within a particular set of constraints (e.g., period of time) minus the number of times that the user experience has been presented to the user within the current set of constraints
f. Maximum number of times that a user can convert on a particular type of user experience within a set of constraints (e.g., a website visit) minus the number of times that the user has converted on that type of user experience during the current set of constraints
g. A split of utility between the publisher and the party implementing the inventive method
h. Drop-off rate for various user experiences, e.g., the probability that a user will disengage from a particular user experience after being presented with the experience (for example, how often a user will drop-off after being presented with a particular campaign)

Data may be collected from some or all user visits to enhance the accuracy of one or more of the metrics identified above.

Using only a portion of the metrics specified above may lead to a different and less desirable outcome. Consider an example in which Wally World owns a theme park and is a publisher that operates a website offering free online games to users. In the example, Wally World may permit an implementer to implement the inventive system and methods such that after a user registers for a membership, the implementer is permitted to provide a user experience to the user. In the example, two campaigns are bidding to be presented as part of the user experience. These exemplary campaigns are identified as "Go Go Car Insurance" (or Go Go) and "Wally World Theme Park." (or WWTP). Assume that Go Go bids $10 for providing a user experience and WWTP bids $8 for providing a user experience. If only the bid amount is considered, the implementer would always provide the Go Go user experience to the user via the publisher due to the higher bid for the Go Go experience.

If the example is modified to indicate that both are advertising campaigns seeking a conversion and the campaign conversion rate is 30% for Go Go and 50% for WWTP, then the expected utility of providing the user experience to the user is the bid times the conversion rate. This is $10*30% (i.e., $3) for Go Go and $8*50% (i.e., $4) for WWTP. In this example, the implementer would provide the WWTP user experience to the user via the publisher.

If the example is further modified to require an inquiry before the user experience as follows, the result may change. Assume that Go Go requires an affirmative answer to the question "do you own a car?" and that such affirmative answers occur at a rate of 40%. Also assume that WWTP requires an affirmative answer to the question "do you like theme parks?" and that such affirmative answers occur at a rate of 25%. In this instance, the answer rate can be factored into the utility calculation leading to an expected utility of $1.20 for Go Go (i.e., $10*30%*40%) and an expected utility of $1 for WWTP (i.e., $8*50%*25%).

Assume that the example is further modified such that the amount of revenue that the implementer shares with the publisher differs for each advertiser. For example, if 72% of revenue from Go Go is shared with the publisher and 95% of revenue from WWTP is shared with the publisher, then Go Go presents an expected utility of $0.86 (i.e., $10*30%*40%*72%) and WWTP presents an expected utility of $0.95 (i.e., $8*50%*25%*0.95). In this instance, it is more desirable to the publisher to present the WWTP user experience than the Go Go user experience.

Assume that the example is further modified such that the drop-off rate for the Go Go user experience is 10% and the drop-off rate for the WWTP user experience is 50%. In such an instance, Go Go would present a higher expected utility to the publisher, because the publisher would expect to capture 90% of the $0.86 from Go Go but only 50% of the $0.95 from WWTP.

Thus, it can be seen that the specific set of metrics used to determine the user experience to present may result in differing results even in the simplistic example presented above. In a real-world system having tens, hundreds, or thousands of user experiences to be presented, the variance may be more pronounced.

Many prior art systems present users with a predetermined user experience that either presents each user with the same experience regardless of information gathered from the user during the user's progression through the experience and without attempting to determine whether the progression should be altered. Other prior art systems may have a tree that branches, for example, if a user answers "yes" to a yes/no inquiry, a first branch is taken and if the user answer "no" to that question a second branch is taken. However, as with the other prior art systems, such branching systems do not dynamically attempt to determine the user experience to enhance the utility gained in the process. The inventive system, however, overcomes these predetermined single path or branching path systems by providing for a dynamically determined user experience and may implement this dynamic experience in the manner described herein to enhance the functionality of the computing devices used in the inventive system and method.

In an embodiment of the inventive system and method, at each step of the process after a user has completed a portion of the user experience, the system may take one of three steps based on the information that is available to the system. It may (1) present the user with an additional inquiry, (2) present the user with another type of experience (e.g., an advertising campaign), or (3) end the user experience. This is preferentially dynamically determined according to the methods set forth herein.

Figure 1B:
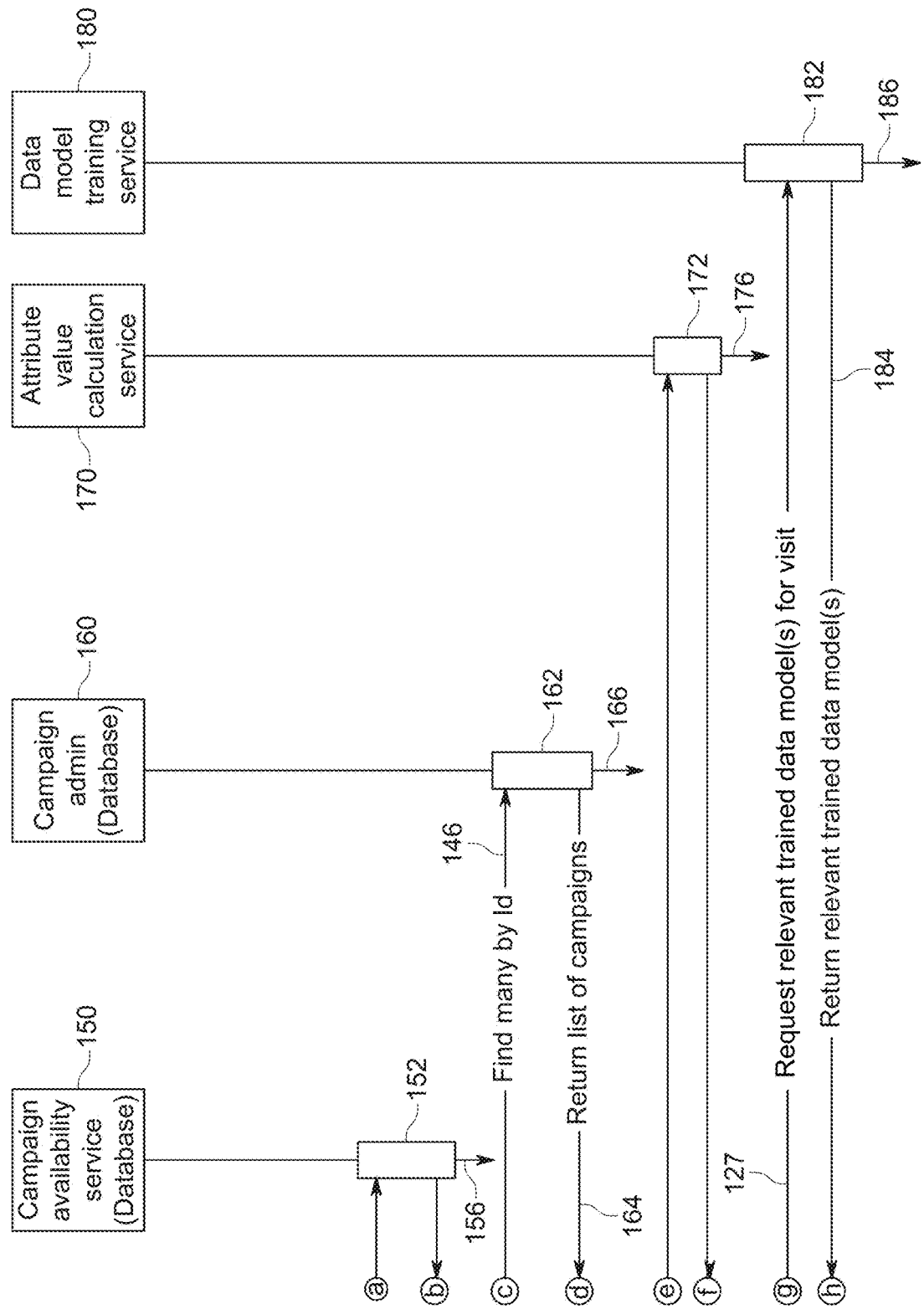

Referring now to FIGS. 1A and 1B, the inventive system and method may be implemented using a services-oriented architecture, micro services architecture, or event based architecture, rather than a generic computer architecture to enhance the speed and efficiency over what would be encountered in the prior art systems. This enhancement allows scalability to large numbers of users and reduces cycle times to hundreds of microseconds, rather than the multiple seconds encountered in prior art systems and methods. The architecture implements multiple services to handle large volumes of data asynchronously as the data flows through the system. In FIGS. 1A and 1B, nodes a, b, c, d, e, f, g, and h indicate connections between the two FIGS.

System 100 may comprise multiple services 110, 120, 130, 140, 150, 160, 170, and 180.

Front end service 110 provides a user experience to a user, preferably through a publisher website. Service 110 is the service by which an experience may be presented to a user and by which user input may be obtained. It is preferable to direct the user experience data to a publisher and permit the publisher to use the user experience data to provide the user experience to the user. However, it is also possible to present the user experience directly to the user. Publishers may use websites, applications, mobile device applications, and other methods to present user experiences to users. When a publisher indicates (or a user directly indicates) that a user experience should begin, process 112 is initiated and a notification 114 is posted by process 112 to the process 122 of the decision service. Process 112 remains in place to receive feedback notification 128 from process 122 of the decision service 120. Continuation arrow 116 indicates that process 112 may continue beyond notification 128 and send one or more additional notifications 114 to decision service 120 as a user progresses through the user experience.

Upon receipt of notification 114, process 122 of decision service 120 begins requesting information from and tracks the returned information from many of the services. Decision service 120 may be used to oversee much of the process regarding the appropriate inquiry, e.g., question or advertising campaign, to eventually transmit to front end 110 via notification 128. Continuation arrow 129 indicates that process 122 may continue to operate beyond what is indicated in this figure.

Process 132 of visit tracking service 130 receives a request for a tracking ID from decision service 120 via notification 124. Visit tracking service processes the request and returns a visit object that may include a tracking ID to process 122 via notification 134. Continuation arrow 136 indicates that process 132 may keep operating beyond what is indicated on this figure.

Campaign filtering service 140 may be used to match users to appropriate user experiences (e.g., advertising campaigns) based on user attributes. For example, data indicating gender, location, and type of user device may be used by service 140 to filter various types of user experiences. Service 140 may also consider other user specific attributes such as whether a user owns a dog, whether a user is seeking insurance, etc. to match users to appropriate user experiences and/or filter out inappropriate user experiences. Process 142 of campaign filtering service 140 may receive a request to match campaigns from process 122 via notification 125. Such a request may a visit tracking ID and other visit object information included. Eventually, after communications with services 150 and 160, process 142 may return a filtered list of campaigns to process 122 via notification 149. Continuation arrow 148 indicates that process 142 may continue beyond what is indicated on this figure.

Campaign availability service 150 may be used to determine whether a particular user experience or advertising campaign may be available. For example, if a campaign is limited by an advertiser to certain times of day (e.g., before 6:00 pm) or limited in the number of times that it may be delivered to users based on the overall utility to an advertiser of delivering a campaign, the availability service 150 may determine whether such criteria have been met. Service 150 may be augmented by a budgeting service when a budget is specified by an advertiser. Process 152 of service 150 may receive a request for available campaigns via notification 144 from process 142. Notification 144 may include a list of appropriate campaigns for which process 142 is requesting an indication of availability or unavailability. Process 152 is then configured to determine the availability of the various identified campaigns based on the appropriate availability criteria and return a list of such campaigns to process 142 via notification 154. Such list may comprise a list of campaign IDs. For efficiency, it may be preferable to provide a database to service 150 wherein such database may be limited to storing campaign IDs and availability criteria. Continuation arrow 156 indicates that process 152 may continue beyond what is indicated on this figure.

Campaign administration service 160 is a service that allows advertisers or their agents to provide information used for administering campaigns within the inventive system. Such information may include identifying information, utility bids or indications, and other relevant information as is discussed in additional detail below. Process 142 may provide a list of available campaign IDs to process 162 of service 160 by way of notification 146. Such notification may be an indication that relevant information is needed regarding the identified campaigns. After retrieving the relevant information, process 162 may return the list of campaigns and the relevant information to process 142 via notification 164. Continuation arrow 166 indicates that process 162 may continue beyond what is indicated on this figure. As noted above, process 142 may then provide further filtering of the list of campaigns before returning a filtered list of campaigns via notification 149 to process 122. This filtering may be based on personally identifiable information (PII) such as name, age, address, gender, email domain name, device type, etc. It may also consider campaign filtering attributes, such as campaign age range, campaign desired gender, location, etc.

Information stored in the campaign administration service 160 database may include images, sounds, videos, information related to advertising campaigns, advertising materials, and information that provides links to such materials if such materials are stored using a remote service such as Amazon's S3 service or a similar cloud storage platform.

After receipt of a filtered list of campaigns via notification 149, process 122 may request via notification 126 that process 172 of attribute value calculation service 170 determine all question (or inquiry) series that have a cost less than or equal to the remaining number of questions (or inquiries) allowed. This request is intended to determine which relevant series of questions may be permitted within the constraints related to the number of inquiries permitted by the front-end service. For example, it may be desirable to determine whether a user owns a 4-wheel drive vehicle. Doing so may require asking two questions: 1) "do you own a vehicle?"; and 2) "is your vehicle a 4-wheel drive vehicle?" Such questions may be desirable for an automobile insurance company, specialty magazine, or other advertiser who wishes to advertise or collect information from owners of 4-wheel drive vehicles. In this example, the question series is the indicated list of questions needed to obtain the ultimate attribute(s) needed for a particular campaign or user experience. The exemplary question series included two questions, however, question series may include any number of questions. Question series are preferably generated by determining an attribute gap that indicates attributes needed for a particular campaign that are not already known to the advertiser or service providing the inventive method. After determining this gap, it is preferably to generate a series of questions that, if answered, resolve the gap by determining whether the needed attributes are present. In the instance where an attribute is needed by more than one campaign, it may be possible to share question series or portions of question series to reduce the cost of identifying any particular attribute. For example, if one campaign desires to know whether a user owns a purple vehicle and another campaign desires to know whether a user owns a 4-wheel drive vehicle, both might have a common first attribute that may lead to a common first question (e.g., "do you own a vehicle?") and differing second attributes that may lead to different second questions.

Thus, the attribute value calculation service 170 considers the remaining number of inquiries permitted by the publisher and determines all relevant question series that include a number of questions that is equal to or less than the remaining number of inquiries permitted. Process 172 may return all of the appropriate question series to process 122 via notification 174. Continuation arrow 176 indicates that process 172 may continue beyond what is indicated in this figure.

The data model training service 180 implements process 182 to calculate the campaigns that provide the most utility based upon the filtering that has occurred prior to invoking service 180. Upon receiving a request for a relevant trained data model from process 122 via notification 127, process 182 will preferably multiply the amount of utility that was bid in a campaign by a conversion rate. The product is multiplied by the answer rate, which results in a product that is multiplied by the percentage of utility provided to the operator of the system. That product is multiplied by the drop-off rate, as indicated above. This is preferably performed for each of the identified campaigns and results, for each campaign, in an expected utility to be gained by presenting each of the possible user experiences to the user. After each of these expected utility values is determined, process 182 returns the expected utility values to process 122 via notification 184. Continuation arrow 186 indicates that process 182 may continue beyond what is indicated in this figure.

Upon receipt of notification 184, process 122 may determine the data model with the highest expected utility and use that data model to determine the contents of notification 128, which is then sent to process 112. In certain instances, the relevant trained data model(s) may indicate that it is not desirable to provide a further user experience. In such an instance, notification 128 may indicate to process 112 that no further user experiences are available. For example, if a publisher only permits user experiences for which the publisher obtains a minimum threshold amount of utility and notification 184 does not return any data models that meet the minimum threshold, then notification 128 may indicate to process 112 that no further user experiences will be provided. In the instance that no further user experiences are provided, front end service 110 preferably indicates to the publisher that the user should be directed to content provided by the publisher.

The process illustrated in FIGS. 1A and 1B may be repeated multiple times. For example, in a user visit in which the publisher allows 10 inquiries of the user, the process outlined in FIGS. 1A and 1B may be repeated 10 times to provide 10 user experiences to the user. Repeating the entire process may be necessary because certain filtering attributes, budget attributes, or other restrictions may have occurred in the time since notification 114 was initially sent. For example, if a user begins the process at 5:59 pm and takes a few minutes with the user experience returned in notification 128, then any campaign that is unavailable after 6:00 pm will be unavailable when the user is prepared to request or trigger the next user experience. Thus, the process of FIGS. 1A and 1B should preferably be repeated to ensure that the now-unavailable campaign is not included in the results. Other changes in circumstance may also require this, including for example if an advertiser disables a campaign, if a campaign budget cap is met, or if a campaign or question reached its default metric threshold and the decision engine switched over to using the actual metrics for that object.

In some embodiments it may be desirable to split one or more of the above-identified services into multiple services if the load on a particular service is too great. It may also be desirable to remove certain services or to add additional services if additional features are added to the system.

Figure 2:
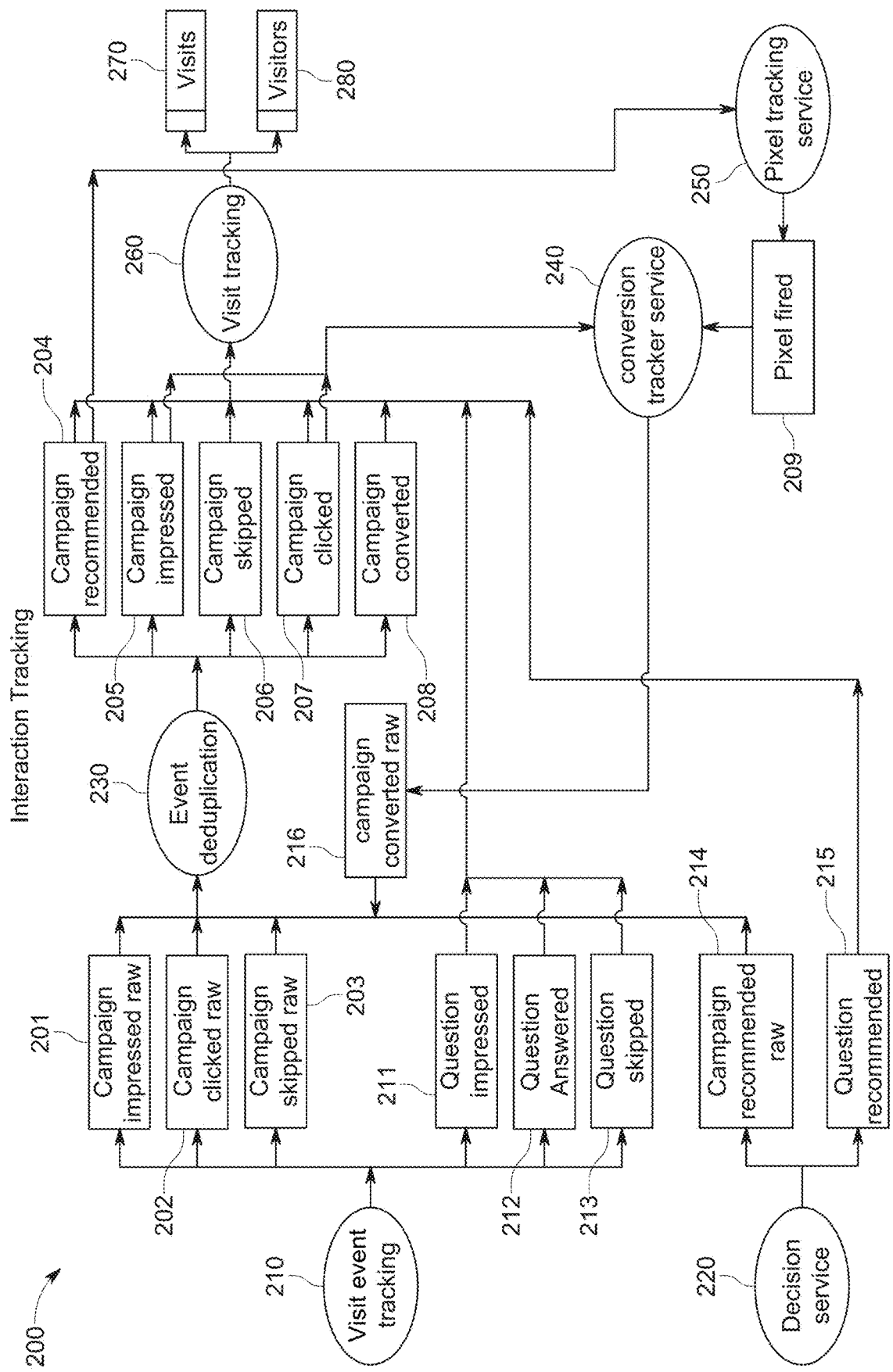
FIG. 2 illustrates an example of data flow and data processing that may be implemented in the inventive system and method.

Referring now to FIG. 2, a representation 200 of data flow within the inventive system and method is provided.

Visit event tracking service 210 corresponds to the data flow that is expected to occur after notification 128 returns a campaign or question to process 112 and the user is given an impression of the campaign or question. When a question is provided to a user, QuestionImpressed event 211 occurs. In connection with this impression of the question, a user may either answer a question (in which case QuestionAnswered event 212 occurs) or skip the question (in which case QuestionSkipped event 213 occurs). In the instance where any of events 211, 212, or 213 occur, each of those events that occurs is picked from the data stream by visit tracking service 260. Service 260 then modifies two database documents, i.e., visits document 270 and visitors document 280, to indicate the results of the relevant events of events 211, 212, and 213. It may be preferable in some embodiments to provide a database using JSON-like documents with schemas. One such database is identified using the tradename mongoDB and is provided as an open source software project.

Because FIG. 2 illustrates data flow among asynchronous services, it should be noted that certain events are identified as "Raw" events. Such designation is useful because, in certain embodiments, multiple services may be pulling the same items from the data stream and performing operations related to such items without regard to whether other services are also using the same items. Such designation may also be useful if the user causes duplication by refreshing the browser, clicking an item more than once, using a browser that is having problems, etc. Accordingly, duplication of events or results of events may occur if proper controls are not implemented. By way of example, if a user views a campaign, the system may insert a CampaignImpressed event into the data stream. At that point, in certain embodiments, it may be possible that more than one of the services that is viewing the data stream may act upon the CampaignImpressed event when each of these services identifies that event in the data stream. These services may include services that track budget for a campaign, services that track conversion rates for a campaign, etc. Each service may be altering or appending data in the CampaignImpressed event simultaneously or in overlapping fashion. If and when this happens, the services may both reinsert the CampaignImpressed event into the data stream with slightly different data, such that the single CampaignImpressed event appears to be two separate events in the data stream. In other embodiments, duplication may occur due to user error or other functionality problems. Such duplication can be prevented by providing a unique identifier for each event and implementing a deduplication service, such as Event Deduplication service 230 to eliminate duplication.

To prevent certain instances of duplication, it is preferable to use a slightly different event that will be handled only by the deduplication service 230 when that event occurs in the data stream. In this exemplary embodiment, CampaignImpressedRaw event 201, CampaignClickedRaw event 202, and CampaignSkippedRaw event 203 respectively indicate whether a user was given an impression of a campaign and either clicked on the campaign or skipped the campaign. Appending the "Raw" tag to the event, in this example, is a signal that only the deduplication service 230 should handle the event. After the deduplication service pulls one of the "Raw" events from the data stream, service 230 inserts a corresponding event or events into the data stream from the set of CampaignRecommended event 204, CampaignImpressed event 205, CampaignSkipped event 206, CampaignClicked event 207, and CampaignConverted event 208. Visit Tracking service 260 will pick up each of these events from the data stream as indicated by the arrows from each of events 204 to 208 that extend to service 260.

In addition, Conversion Tracker service 240 will pick up CampaignImpressed event 205 and CampaignClicked event 207 from the data stream. The CampaignRecommended event 204 is also picked up by Pixel Tracking Service 250, which inserts a PixelFired event 209 into the data stream. The PixelFired event 209 is picked up from the data stream by Conversion Tracker Service 240.

A Conversion Tracker Service 240 such as this is useful where the system is intended to support multiple manners of permitting conversion tracking. One such manner of tracking conversions is a "CPM" (or cost per thousand impressions) model wherein an item having utility is transferred in exchange for every thousand impressions of the campaign. Thus, for a CPM model, it is important that CampaignImpressed event 205 be captured by service 240. Another manner is a "CPC" (or cost per click) model wherein an item having utility is transferred for every click. Thus, for a CPC model, it is important that CampaignClicked event 207 is captured by service 240. And a third manner is a "CPA" (or cost per action/acquisition) model wherein an item having utility is transferred based on a particular action or acquisition, e.g., an indication that a user signed up for a new service, purchased a product, etc. Thus, for a CPA model, it is important that PixelFired event 209 be captured by service 240. Each of these events captured by service 240 is preferably used to document when an item having utility should be transferred from an advertiser to another party. After Conversion Tracker Service 240 receives one of events 205, 207, or 209, service 240 generates an appropriate CampaignConvertedRaw event 216 in the data stream. Preferably, only event deduplication service 230 will handle event 216 and thereafter, when it is not a duplicate, service 230 will insert a CampaignConverted event 208 into the data stream for processing by Visit Tracking service 260.

When a CPA campaign is used within the inventive system, an advertiser is provided with a unique pixel address that may be provided to a user viewing the campaign. This pixel may be provided by the entity implementing the inventive system. The pixel may be assigned a unique pixel address so that the entity may record information about the pixel being accessed. The pixel may be provided to the user by the entity providing code to an advertiser; the advertiser may then insert the pixel and code into the advertiser's web site (e.g., on a conversion page or a goal-met page) or within an email indicating that a goal has been met. Such goals may include a user signing-up, a sale of a product, a referral sent, etc. Upon the user viewing the campaign, e.g., on a website, the pixel address is loaded by the user's system, which causes an indication within the data stream that the pixel was loaded. This indication will result in the PixelFired event 209 being inserted into the data stream. It is also possible to send a data payload to the entity when the pixel is loaded; such data may be used to track aspects of the user's visit to the website or other browsing information.

It is important to note that for each unique user event or action, it is likely that only a single thread will flow through the data stream, although that thread may split. For example, if a user clicks upon an advertising campaign, the CampaignClickedRaw event 202 will be generated and placed into the data stream by Visit Event Tracking service 210. That event 202 will be processed for deduplication by service 230 and, upon deduplication, service 230 will place a CampaignClicked event 207 into the data stream. The CampaignClicked event 207 will be processed by Visit Tracking service 260 and, if it is a part of a CPC model, it will also be processed by Conversion Tracker service 240. Conversion Tracker service 240 will generate a CampaignConvertedRaw event 216 and place it into the data stream. Service 230 will act upon event 216 to deduplicate it. Upon deduplication, if the event 216 was not a duplicate, then service 230 will insert a CampaignConverted event 208 into the data stream. Service 260 will pick up event 208 from the data stream and make appropriate amendments to either or both of documents 270 and 280. In a similar manner, other types of user or system actions may result in data flowing through the data stream and relevant services, as indicated by the flow arrows in FIG. 2.

Due to the potentially high volume of data in the data stream, it is preferable to use a streaming platform that can accommodate high volumes of data from many users simultaneously. One system that may be used as a streaming platform is marketed under the tradename Kafka by the Apache Software Foundation. Acceptable systems will preferably allow a number of services to view and operate on the data stream simultaneously and asynchronously. When using a service such as this, each service operates independently and seeks the data that it is configured to seek in the data stream. This allows for an easily changeable or scalable system because services can be added or removed without directly affecting other services. In a preferred embodiment of the invention, a streaming platform may be operated on one or more servers devoted to optimization of the streaming platform while the various services are operated on one or more separate servers. Each service may be operated on its own server, a parallel arrangement of multiple servers, or on a server shared with another service. However, it is preferred that the streaming platform be operated on its own server(s) due to the expected high volume of data-handling expected in such platform.

In the exemplary data flow shown in FIG. 2, it should be noted that none of events 211, 212, and 213 is processed by the deduplication service 230. However, this is depicted in this manner to indicate that if a limited set of services is operating on a set of events such as events 211, 212, and 213, deduplication may not be necessary. Additionally, certain services may not need deduplication because user or browser activity is less likely to cause relevant duplication. However, it should be understood that where necessary due to processing requirements or desires, the deduplication service can be configured to act upon additional events including, for example, events 211, 212, and/or 213. Similarly, the deduplication service 230 can be configured to cease acting on other events.

Decision service 220 corresponds to decision service 120. Similarly, notification 128 which returns either a campaign or question corresponds to the events emerging from service 220. When a question is returned in notification 128, this corresponds to decision service 220 inserting a QuestionRecommended event 215 into the data stream. Similarly, when notification 128 returns a campaign, this corresponds to decision service 220 inserting a CampaignRecommendedRaw event 214 into the data stream. In the inventive system, after decision service 220 recommends a question or campaign, a user may be impressed with the question or campaign resulting in Visit Event Tracking service 210 generating either a CampaignImpressedRaw event 201 or a QuestionImpressed event 211. In some instances a user system failure or user action may result in the creation of an event 214 or 215 without the corresponding creation of an event 201 or 211. This may occur when an interruption of service, computer failure, browser closing, or other event occurs after the first event and before the second event. Accordingly, it is preferable to insert and track these types of events separately.

It is preferable, in the data flow depicted in FIG. 2, to use a visits document 270 to track the events that occur in a single visit by a single user to the service. Similarly, it is preferable to use a visitors document 280 to track relevant data related to all of the visits by a particular visitor to the service. This tracking in document 280 may be aggregated over time or limited to a certain time period. Visits may be tracked, for example, by a combination of PII or other relevant information related to a visitor, such as name, email address, IP address, phone number, cookie on a browser, or other data that the user may provide to the service.

Figures 3, 4:
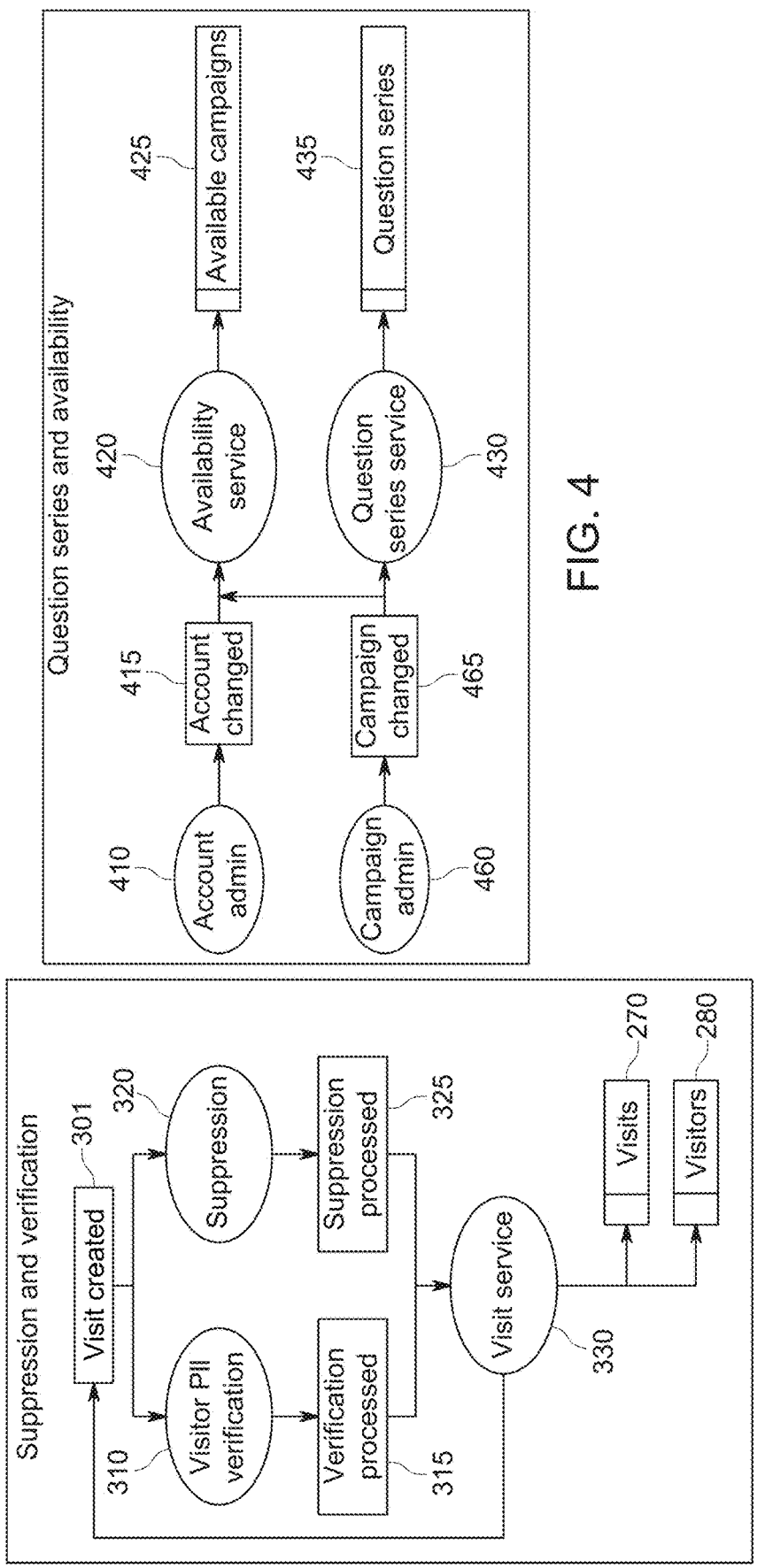
FIG. 3 illustrates an example of data flow and data processing that may be used for suppression and verification.
FIG. 4 illustrates an example of data flow and data processing that may be used for account or campaign administration.

Referring to FIG. 3, a suppression and verification feature data flow is depicted. The suppression data flow may be used to determine whether an advertiser has a particular customer or user within their database prior to impressing the user with an advertising campaign. For example, if an advertiser has a user named "Bob Smith" as a client, that advertiser may indicate that it does not desire to pay for delivering its advertising campaign to user "Bob Smith." Thus, it is desirable to be able to query whether the advertiser recognizes the user prior to delivering a campaign to the user.

Unlike known services, the inventive service implements a novel suppression method. Existing systems may employ a suppression method wherein a suppression check or "pre-ping" is run prior to delivering an advertisement or portion of a campaign. In existing systems, if the suppression check returns an error or does not return a timely result, the systems may impress a user with an advertisement or campaign, but later learn that the advertisement or campaign should have been suppressed for the user. This results in loss of revenue because an advertiser often will not pay to deliver an advertisement to or to convert an existing customer.

In the inventive system, if the advertiser does not respond to a suppression check affirmatively indicating that it is permissible to deliver an advertisement, then the advertisement will not be delivered. This method goes against conventional industry knowledge, but results in less revenue lost due to delivering advertisements for which an advertiser will not pay. This method is further enabled by the process set forth in FIGS. 1A and 1B. Specifically, the campaign availability check performed through notification 144 and process 152 may be integrated with the suppression check such that if an advertiser responds that a user need not be suppressed, process 152 may be prompted to include that indication as part of its determination of whether the campaign is available. In the alternative, if an advertiser does not respond or responds that a user should be suppressed, then process 152 may be prompted to exclude the related campaign(s) from the list of available campaigns. It is possible, however, that in a later iteration of the FIGS. 1A and 1B process, the suppression result may change and a campaign may be included in the available campaign list. For example, if the advertiser delays its response to the suppression request for 2 seconds, the first iteration of process 152 may not include that advertiser's campaign(s) in the list of available campaigns. However, if the user continues to interact with the service, a later iteration of the FIGS. 1A and 1B process that occurs after that 2 second mark may include the previously excluded campaign(s).

Using the inventive suppression method reduces waste of resources by providing users with a user experience that is meaningful and potentially new, rather that provide users with already known information or information related to a company of which the user is already a client. This inventive method further reduces burden on advertisers who no longer need to implement processes to confirm whether their content was delivered to known users and reduce bills based on any instances of such. The inventive method further enhances the utility of the system to other advertisers who may have a lower bid, because rather than being excluded due to an unsuppressed user, in the inventive system, the user has a higher likelihood of seeing the lower-bidding-advertiser's content.

As illustrated in FIG. 3, Visit Service 330 creates a VisitCreated event 301 and inserts it in the data stream. Visitor PII Verification service 310 processes event 301, as does Suppression service 320. Service 310 may use various means to determine whether the user has provided false or faulty identifying information, including name, email address, phone number, mailing address, etc. Service 310 may be an internal service or may refer the verification to an outside company and send that company the necessary information for verification, such as phone number, email address, name, etc. Upon completion of the verification process, including receipt of any information from an outside vendor, service 310 places a VerificationProcessed event 315 into the data stream. This event 315 is processed by Visit Service 330.

Suppression service 320 also processes event 301 from the data stream. As noted above, service 320 sends requests to advertisers to verify whether the user is a user for whom advertising should be suppressed. It is possible that event 301 sends such a request to every advertiser using the service, which could be tens, hundreds, or thousands of advertisers. In the alternative, advertisers may trust the service to handle suppression and may provide a suppression database so that the service 320 may send the request for verification to an internal database. Upon receipt of suppression information, service 320 places a SuppressionProcessed event 325 into the data stream. Because service 320 may receive data from hundreds of advertisers, it may be necessary for service 320 to place hundreds of events 325 into the data stream, as each request advertiser sends the suppression information to service 320. Alternatively, it may be possible for the suppression data to be processed by allowing access to a suppression database or allowing an upload of data in a batch or file prior to suppression processing. Ideally, the suppression check should be performed in hundreds of milliseconds such that the system can complete the entire process in less than a second. It may be preferable to pause the processing of the user's visit for 500 milliseconds to permit PII verification and suppression by services 310 and 320. It is also desirable to handle suppression through direct access to a third party database wherein the advertiser informs the service of the manner in which suppression service 320 can directly query and receive a response from the advertiser's suppression database to ensure that the request is processed promptly. If an advertiser does not offer a suppression service, it is desirable to provide an indication that the advertiser's campaign is deemed to be not suppressed. Finally, it is desirable to execute the suppression process only a single time for a user within a relevant time period, e.g., the suppression process might only be executed once per day for a given user. Event 325 is processed by Visit Service 330.

Visit Service 330 updates visits document 270 and visitors document 280 with the results obtained from events 315 and 325. Service 330 may correspond to service 260.

Referring to FIG. 4, this FIG. illustrates an exemplary process flow for processes in which account administration or campaign administration details are modified. An advertiser may utilize Account Admin service 410 to modify account information as set forth in further detail below. Upon modification of account information, service 410 places an AccountChanged event 415 into the data stream. Similarly, an advertiser may use Campaign Admin service 460 to modify information related to a campaign as set forth in further detail below. Upon modification of campaign information, service 460 places a CampaignChanged event 465 into the data stream. Question Series Service 430 and Availability Service 420 both process event 465 from the data stream. And service 420 also processes event 415 from the data stream. AvailableCampaigns document 425 may be updated by Availability Service 420. Similarly, QuestionSeries document 435 may be updated by Question Series Service 430. Although documents 425 and 435 may be implemented using any compatible database, it is preferable to implement both types of documents with the same type of database systems as is used to implement documents 270 and 280.

One example of a change to a campaign that might require a change to the question series would be a change by an advertiser who was previously willing to pay 1 unit of utility to determine whether a user possessed a car to a condition that the advertiser would later be willing to pay 100 units of utility to determine whether a user possessed a 4-wheel drive vehicle. Such a change in service 460 would preferably trigger a change to a questionSeries document 435 by service 430 to indicate that now two questions would be required rather than a single question.

An example account change might be a change to indicate that an available campaign was no longer available or vice versa. Such a change would trigger an event 415 to be processed by service 420 that would result in the modification of document 425. Another exemplary change might be a modification to increase or decrease a budget or modify a schedule. Such changes might make a previously available campaign unavailable or might make a previously unavailable campaign immediately available. For example, if a campaign had reached a daily budget and become unavailable, then the advertiser increased the budget, such a change may result in the campaign becoming immediately available. Similarly, a change in the hours of campaign availability might render an available campaign immediately unavailable or render an unavailable campaign immediately available. It will be understood that other changes in an account or campaign may trigger an appropriate event 415 or 465 and a corresponding change to one or more of documents 425 and 435.

Figure 5:
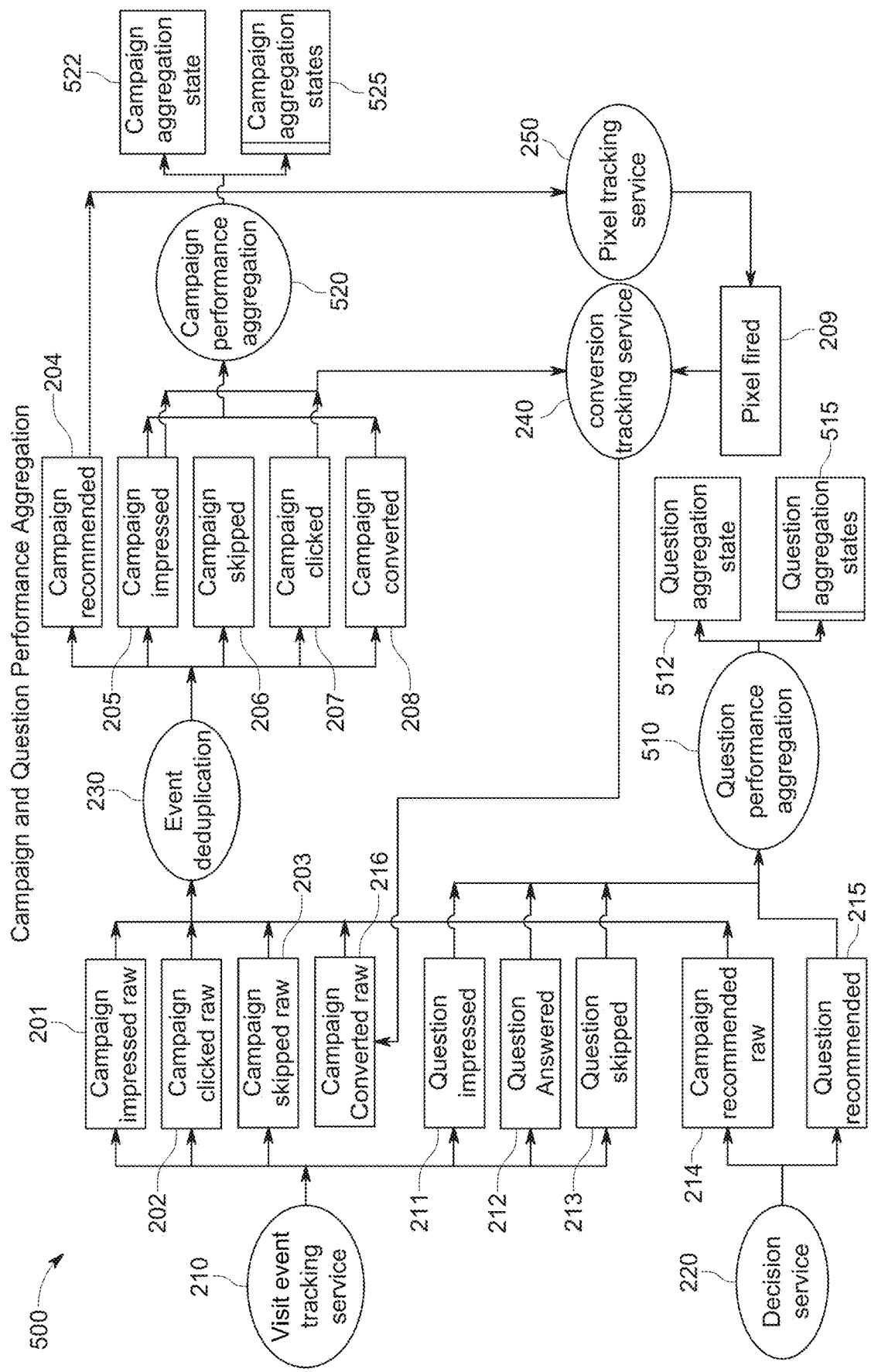
FIG. 5 illustrates an example of data flow and data processing that may be implemented in the inventive system and method.

Referring now to FIG. 5, a representation 500 of data flow within the inventive system and method is provided. FIG. 5 refers to many of the same elements and data flows that are represented in FIG. 2. As depicted herein, Campaign Performance Aggregation service 520 acts on CampaignImpressed event 205 and CampaignConverted event 208 from the data stream. Service 520 uses the data in events 205 and 208 to update campaignAggregationStates document 525, which itself may be implemented using the same database system as is used with respect to documents 270 and 280. Document 525 is preferably used to store the conversion rate identified above that is used in determining the user experience that should be presented to users. A decision engine may read document 525 to retrieve the conversion rate for one or more relevant campaigns. The number of campaign impressions recorded in events 205 and number of campaign conversions recorded in events 208 may be compared to determine a rate at which users who are impressed with the campaign actually convert the campaign. The aggregated conversion rates and/or totals (rather than raw data) may be stored in document 525 to increase system performance and reduce the number of calculations needed to determine which user experience to provide to a user.

It is worth noting that a campaign will have conversion rate that usually varies based on the placement of the campaign. If no conversion rate is known due to a small number of users who have seen the campaign, it is possible to use a default conversion rate until enough data has been gathered to calculate a conversion rate with some level of confidence. For example, the inventive system and method may be given a default conversion rate of 32.5% that should be used until 300 users have been impressed with the campaign and then switch to the actual conversion rate after 300 users have been impressed. Similarly, the answer rate for a given answer to a question may be given a default answer rate until a sufficient number of users has answered a question. For example, a question with 4 answers may be assigned a default answer rate of 25% to each of the answers until at least 350 users have answered the question. The system may be instructed to use the actual answer rate after 350 users have answered the question.

Also as depicted herein, Question Performance Aggregation service 510 acts on QuestionImpressed event 211, QuestionAnswered event 212, QuestionSkipped event 213 and QuestionRecommended event 215 from the data stream. Service 510 uses the data in events 211, 212, 213, and 215 to update questionAggregationStates document 515, which itself may be implemented using the same database system as is used with respect to documents 270 and 280. Document 515 is preferably used to store the answer rate identified above that is used in determining the user experience that should be presented to users. A decision engine may read document 515 to retrieve the answer rate for one or more relevant questions and/or answers of that question. The number of question recommendations and impressions recorded in events 211 and 215 and the type and quantities of answers and/or skips recorded in events 212 and 213 may be compared to determine a rate at which users who are impressed with a question provide a particular answer. The aggregated answer and skip rates and/or totals (rather than raw data) may be stored in document 515 to increase system performance and reduce the number of calculations needed to determine which user experience to provide to a user.

Referring to FIGS. 6A, 6B and 6C, an exemplary layout for capturing information related
to the users which an advertiser wishes to target is provided to illustrate an embodiment of providing this functionality to an advertiser. A customize network block 610 may be provided to permit the advertiser to select publishers' properties on which the advertiser wishes to make its user experience available. As illustrated, the exemplary advertiser has chosen Pete's Wardrobe and Daily Style INC. An option to manage properties may permit an advertiser to select multiple properties from a list of existing properties. An advertiser may be given the opportunity to bid different amounts for placements within each property. Node w indicates the connection between FIGS. 6A and 6B. Node i indicates the connection between FIGS. 6B and 6C. Node x indicates the connection between portions of FIG. 6C.

A demographic block 620 may be provided to permit an advertiser to specify demographic characteristics of a desired user group. Such characteristics may include age ranges, gender, location, type of user device, email service provider, etc. Within some or all of the demographic groups it may be desirable to provide an option to bid different amounts based on the demographic. For example, it may be desirable to bid a higher amount for providing a user experience to a female user than to a male user. Or it may be desirable to bid a higher amount to provide a user experience to a tablet computer user than to a mobile device user. In some demographic categories, multiple choices may be provided, for example, a listing of various device types on which the user experience may be shared could include desktop, mobile, tablet, in-app, and/or other types of devices.

In another example, an advertiser may provide (a) a targeting list that includes identifying information for particular individuals, such as email address, phone number, or other identifiers, and (b) a list of sought attributes (for example, whether the individual expects to change cell phone service providers within a particular period of time, e.g., within the next three months), and (c) a bid indicating that delivering the sought attributes has a set amount of utility to the advertiser and that the advertiser will surrender such amount of utility to the party who delivers the attributes to the advertiser. In such instances, the system may perform a check to determine whether the user is included in the targeting list. If so, then the bid may be considered along with other bids when determining whether to present relevant questions or experiences to the user in an attempt to determine the sought attributes. If the bid is sufficient when considered in concert with the other relevant factors, then an experience may be presented to the user in an effort to determine the relevant attributes.

A visitor attribute block 630 may be provided to permit an advertiser to determine specific attributes of a user to which the advertiser may wish to provide a user experience. Such attributes may include whether the user has or relates to arthritis, auto insurance, no auto insurance, back pain, beauty, cooks, diabetes, dining out, financial investing, financial planning, fashion, shopping deals, etc.

Referring to FIGS. 7A and 7B, an exemplary layout for capturing bids and providing statistics related to bids is provided to illustrate a preferred method of providing such functionality to an advertiser. A set of targeting parameters for desired users may be provided, such that differing amounts may be paid for the same campaign depending on whether the user receiving the user experience has a set of characteristics that has higher utility or lower utility to an advertiser. For example, in the "Target" column, it can be seen that age, gender, type of device (e.g., mobile, laptop, desktop, etc.), and interests (e.g., shopping deals, fashion, etc.) can be set as parameters for a multiple bids for a campaign. Node y indicates the connection between FIGS. 7A and 7B.

As can be seen in the first two rows, an advertiser bidding on a placement with publisher "Pete's Wardrobe" may value a female user higher than a male user as indicated by the current bid of $2.50 for a female user versus $0.50 for a male user. As seen in the first and third rows, a male interested in "fashion" may be valued higher than a similar male interested in "shopping deals" as indicated by the current bid of $0.50 for a male interested in fashion as opposed to $0.20 for a male interested in shopping deals. Differing placements (as indicated in the placement column) may affect the utility of the user to the advertiser, resulting in bids that differ based on the "placement."

As illustrated in FIGS. 7A and 7B, a property column may be provided to indicate the publisher's website or app through which the campaign may be published. A placement column may be provided to indicate different options for where a campaign is published within a publisher's system. A current status column may be provided to indicate whether a campaign is active, paused, or enjoying another status. A current bid column and current daily limit column may be provided to allow an advertiser to input the utility value of bids and the maximum daily utility that a campaign may have to an advertiser. A cost column may be provided as an indicator of the cost of the campaign, which may be computed by summing the cost of each billable lead (or conversion). An impressions column ("Impr") may be provided as a count of how many times the campaign was displayed to users. An Opt-In % column may be provided as an indicator of how well a campaign is performing with users and can be calculated by dividing the number of "Billable Leads" by the number of "Impr". "Billable Leads" (or conversions) may be presented as a count of the number of times users converted on a campaign. "Cost per Billable Lead" may be presented to indicate the average rate at which an advertiser is paying for leads and can be calculated by dividing the "Cost" by the "Billable Leads". An accepted lead percentage may be indicated in the "Accepted Lead %" column as calculated by dividing the number of "Accepted Leads" by the number of "Billable Leads". "Accepted Leads" may be provided as a count of the number of times an advertiser successfully added a lead to their database. The cost may be divided by the number of accepted leads to generate a cost per accepted lead as indicated in the "Cost per Accepted Lead" column. Finally, an eCPM value may be determined by dividing the cost by the number of impressions and then multiplying the result by 1,000 to generate an expected cost per thousand impressions. This figure may be displayed in the eCPM column.

In FIGS. 7A and 7B, all indicators of utility, denominated "bid," "limit," "cost," or "eCPM" are denominated in dollars. However, one of ordinary skill will recognize that utility may be denominated in various manners and that dollars is merely as stand-in for purposes of clarifying one potential use of the inventive system and method.

Referring to FIGS. 8A and 8B, an exemplary layout for capturing publisher settings is provided to illustrate the type of data that may be collected from publishers in certain embodiments of the invention as well as a manner of collecting such data using browser software and a markup language such as HTML. A settings block 810 may be used to name a type of user experience and a provide a description of the type of user experience for future ease of reference. An experience block 820 may be used to identify the maximum number of inquiries that may be presented to a particular user. It is also preferable, in experience block 820, to permit a publisher to identify whether users are permitted to skip certain user experiences (e.g., questions) and to identify a minimum effective CPM ("eCPM") that the publisher will accept to allow a campaign to be published on the publisher's placement. Node z indicates the connection between FIGS. 8A and 8B.

Campaign type selections are preferably permitted in blocks 830 and 840. A campaign selection block 830 may permit a publisher to indicate the types of campaigns (e.g., simple opt-in email, simple opt-in phone, link out, etc.) that may be delivered to users on the publisher's placement. In the alternative, another campaign type may be a retargeting cookie that may be placed on a user's computer such that the user is delivered a particular advertisement when later browsing another website. In the alternative, a "data augmentation" campaign by an advertiser may seek to enhance an existing database of user information by requesting particular information (e.g., the attributes that the invention collects, which may include attributes such as medical conditions, interests, whether the user would like to evaluate a new service provider such as a cellular service provider, etc.) and recording that information for the advertiser. Yet another campaign type may be a market research campaign that seeks to determine responses to a particular question or set of questions from a large number of users. A campaign limits block 840 may permit a publisher to select the maximum number of times a visitor can see or convert on a campaign type in a single visit to the publisher's placement. For example, a publisher might specify that a user may see a maximum of 8 simple opt-in email campaigns and convert a maximum of 6 such campaigns on a single visit. In this situation, if either threshold is reached, no further activity of the specified type will be permitted on the visit.

Referring now to FIGS. 9A and 9B, an exemplary layout for capturing or amending campaign settings may be provided. Settings block 910 may be provided to capture a campaign name, a preferred rate type for the campaign, a vertical to which the campaign is relevant (e.g., retail), one or more primary contact methods for contacting users, and an indication of whether it is desirable to collect a visitor's name. Visitor rules block 920 may be used to capture optional rules related to a campaign, for example, the maximum number of times that a campaign may be viewed by a user per day, a maximum number of times that a user can convert on the campaign in a lifetime or a particular time period, and whether user verification is required before accepting a user as a lead. Budget block 930 may be used to capture budgeting thresholds for a campaign, including options to indicate whether a budget is present or whether unlimited spending is permitted, whether the campaign has hourly, daily, monthly, or lifetime budgets, etc. It is desirable to permit daily, monthly, and lifetime budgets simultaneously in the event that an advertiser may wish to spread out advertising over days or months but still retain an overall budget. For example, an advertiser may set a daily budget of $100,000, a monthly budget of $500,000, and a lifetime budget of $2,000,000. In this instance, five days at the maximum daily budget would exhaust the entire monthly budget and four months at the maximum monthly budget would exhaust the entire lifetime budget. A schedule block 940 may be provided to capture a schedule for a campaign. The schedule may include start and/or end dates, whether the campaign is active on all days at all times or whether the campaign should only be available during a particular set of days and times. And an action block 950 may be provided to capture an indication of whether a campaign should be active or paused and whether a campaign should be deleted. Node j indicates the connection between FIGS. 9A and 9B.

Figure 10:
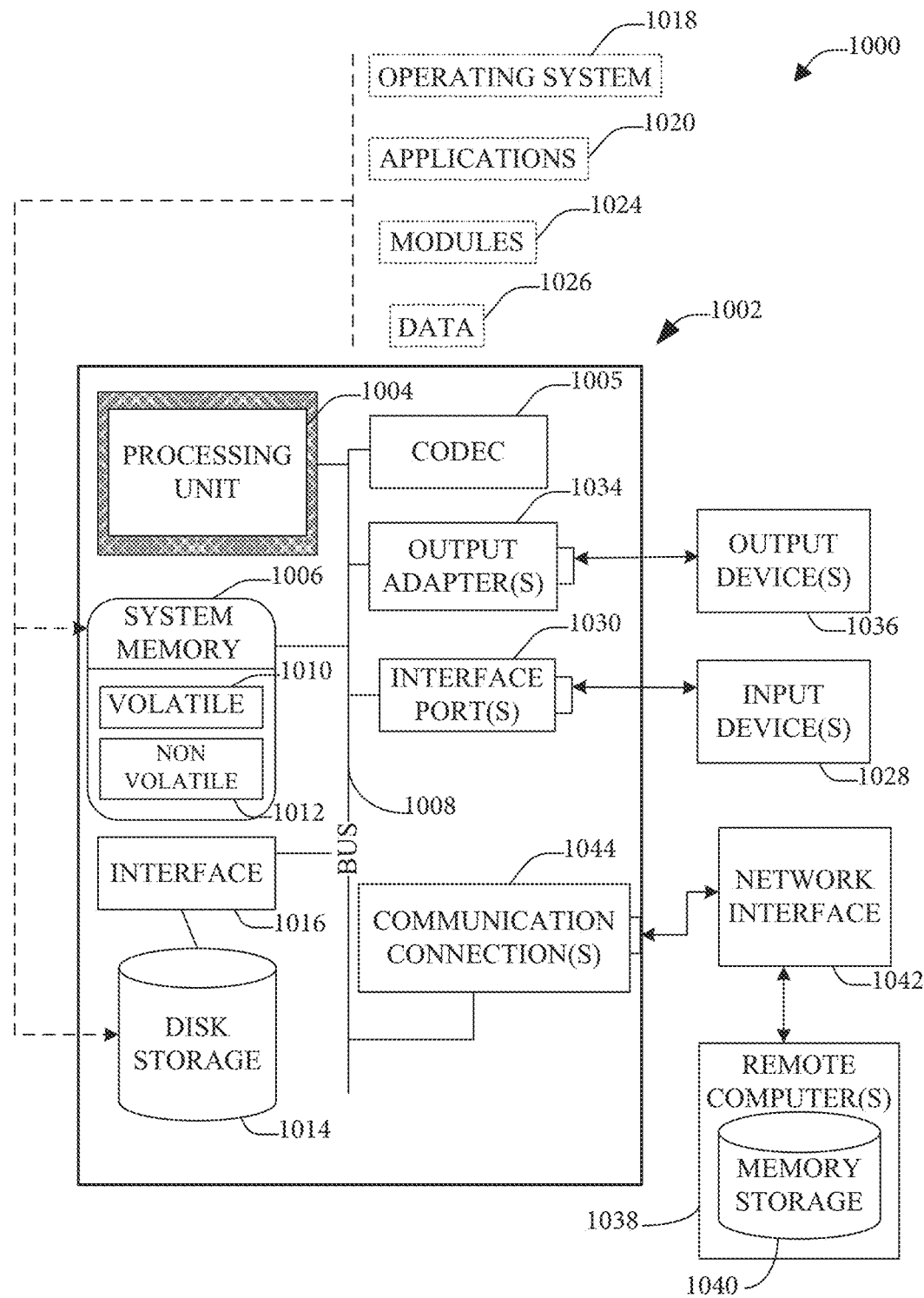
FIG. 10 illustrates an example block diagram of a computer operable to execute the disclosed architecture.

With reference to FIG. 10, a suitable environment 1000 for implementing various aspects of the disclosed subject matter includes a handheld, portable, or stationary computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), and Advanced Graphics Port (AGP).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 1002 may also include removable/non-removable, volatile/non-volatile computer storage media. FIG. 10 illustrates, for example, a disk storage 1014. Disk storage 1014 includes, but is not limited to, devices like a magnetic disk drive, solid state disk (SSD), flash memory card, or memory stick. In addition, disk storage 1014 can include storage media separately or in combination with other storage media including, but not limited to, an optical disk drive. To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a touch screen, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which might require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a client, a processing center, a certificate authority, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
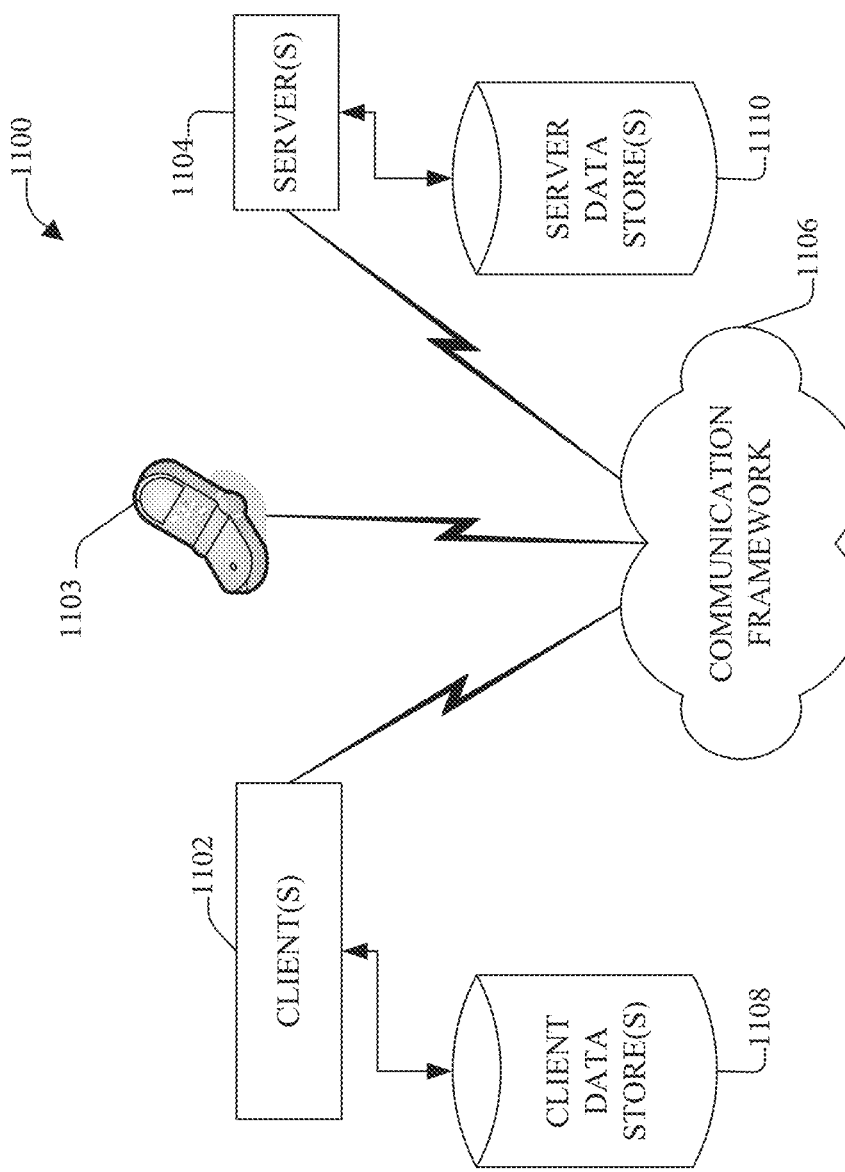
FIG. 11 illustrates an example schematic block diagram for a computing environment in accordance with the subject specification.

Referring now to FIG. 11, there is illustrated a schematic block diagram of a computing environment 1100 in accordance with the subject specification. The system 1100 includes one or more client(s) 1102, which can include an application or a system that accesses a service on the server 1104. The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform, for example, identifying morphological features, extracting meaning, auto generating FAQs, ranking, etc. One possible communication between a client 1102 and a server 1104 can be in the form of a data packet adapted to be transmitted between two or more computer processes where the data packet contains, for example, a certificate. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The illustrated aspects of the disclosure may also be practiced in distributed computing environments where certain tasks are performed by remote processing devices that are linked through a communications network. In a distributed computing environment, program modules can be located in both local and remote memory storage devices.

The processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject embodiments are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the various embodiments includes a system as well as a computer-readable storage medium having computer-executable instructions for performing the acts and/or events of the various methods of the claimed subject matter.

What is claimed is:

1. A data processing method, comprising:
  receiving, with a server communicative with a distributed streaming data pipeline for communication with asynchronous event processing services, an indication of user identification data and an indication of a data source;
  transferring said indication of user identification data and said indication of a data source to memory using a bus within the server;
  determining, based on the indication of the data source and retrieval of information related to the data source from a memory within a database server, an inquiry rule, wherein the inquiry rule defines an inquiry threshold indicative of a maximum number of inquiries to be posed to the user;
  comparing, with the server, an inquiry count to the inquiry threshold, wherein the inquiry count is indicative of a number of inquiries that have been posed to the user; and
  if the inquiry count is less than the inquiry threshold, sending, using the server, an inquiry for the user to the data source, wherein sending the inquiry for the user comprises:
  receiving a plurality of indications of expected utility of an inquiry, wherein one of the plurality of indications of expected utility is calculated by an event processing service based on the utility of an inquiry response, the probability that the user will respond to the inquiry, the user's expected response to the inquiry, and utility sharing percentage,
  comparing, using the server, the plurality of indications of expected utility, transmitting to a remote server a verification request, wherein the verification request includes at least a portion of the indication of user identification data, receiving a response to the verification request from the remote server, wherein if the response to the verification request is received within 500 milliseconds and is positive, the inquiry is not suppressed, wherein if the response to the verification request is not received within 500 milliseconds or is negative, the inquiry is suppressed, and if the inquiry is not suppressed, based on the comparing the plurality of indications of expected utility, transmitting with the server an inquiry to the data source, wherein the transmitting occurs within one second of the receiving the indication of user identification data and the indication of the data source.

2. The method of claim 1 further comprising:
incrementing, with the server, the inquiry count;
if the incremented inquiry count is less than or equal to the inquiry threshold, repeating the step of sending an inquiry; and
if the incremented inquiry count is greater than the inquiry threshold, transmitting an indication of no further inquiries to the data source.

3. The method of claim 1, wherein the inquiry comprises a question for the user to answer or an advertisement for the user to view.

4. The method of claim 1, further comprising:
calculating a difference between the inquiry count and the inquiry threshold; and
if the difference is greater than or equal to a drop-off threshold, determining that the inquiry comprises a question for the user to answer, and
if the difference is less than a drop-off threshold, determining that the inquiry may comprise a question for the user to answer or an advertisement for the user to view.

5. The method of claim 1, wherein the user's expected response to the inquiry is based on past responses to the inquiry by a plurality of prior users.

6. The method of claim 1, wherein
the plurality of indications of expected utility comprises an expected drop-off rate based on the rate at which a plurality of prior users discontinued responding to inquiries.

7. The method of claim 6, wherein
the plurality of indications of expected utility further comprises an indication of the number of inquiries to which a user must respond before any utility is recognized.

8. The method of claim 1, wherein
the inquiry comprises an advertisement for the user to view; and
the plurality of indications of expected utility comprises an expected rate at which the user will take an action upon viewing the advertisement, and wherein the expected rate is based on the rate at which a plurality of prior users took the action upon viewing the advertisement.

9. A data processing system, comprising:
a computation network configured to:
receive, with a server communicative with a distributed streaming data pipeline for communication with asynchronous event processing services, an indication of user identification data and an indication of a data source;

transfer said indication of user identification data and said indication of a data source to memory using a bus within the server;

determine, based on the indication of the data source and retrieval of information related to the data source from a memory within a database server, an inquiry rule, wherein the inquiry rule defines an inquiry threshold indicative of a maximum number of inquiries to be posed to the user;

compare, with the server, an inquiry count to the inquiry threshold, wherein the inquiry count is indicative of a number of inquiries that have been posed to the user; and if the inquiry count is less than the inquiry threshold, send, using the server, an inquiry for the user to the data source, wherein sending the inquiry for the user comprises:

receiving a plurality of indications of expected utility of an inquiry, wherein one of the plurality of indications of expected utility is calculated by an event processing service based on the utility of an inquiry response, the probability that the user will respond to the inquiry, the user's expected response to the inquiry, and utility sharing percentage, comparing, using the server, the plurality of indications of expected utility, transmitting to a remote server a verification request, wherein the verification request includes at least a portion of the indication of user identification data, receiving a response to the verification request from the remote server, wherein if the response to the verification request is received within 500 milliseconds and is positive, the inquiry is not suppressed, wherein if the response to the verification request is not received within 500 milliseconds or is negative, the inquiry is suppressed, and if the inquiry is not suppressed, based on the comparing the plurality of indications of expected utility, transmitting with the server an inquiry to the data source, wherein the transmitting occurs within one second of the receiving the indication of user identification data and the indication of the data source.

10. The system of claim 9, wherein the computation network is further configured to:
increment, with the server, the inquiry count;
if the incremented inquiry count is less than or equal to the inquiry threshold, repeat the step of sending an inquiry; and
if the incremented inquiry count is greater than the inquiry threshold, transmit an indication of no further inquiries to the data source.

11. The system of claim 9, wherein the inquiry comprises a question for the user to answer or an advertisement for the user to view.

12. The system of claim 9, wherein the computation network is further configured to:
calculate a difference between the inquiry count and the inquiry threshold; and
if the difference is greater than or equal to a drop-off threshold, determine that the inquiry comprises a question for the user to answer, and
if the difference is less than a drop-off threshold, determine that the inquiry may comprise a question for the user to answer or an advertisement for the user to view.

13. The system of claim 10, wherein the user's expected response to the inquiry is based on past responses to the inquiry by a plurality of prior users.

14. The system of claim 11, wherein
the plurality of indications of expected utility comprises an expected drop-off rate based on the rate at which a plurality of prior users discontinued responding to inquiries.

15. A non-transient computer-readable medium storing instructions that cause a system comprising a processor to perform operations, comprising:
receiving, with a server communicative with a distributed streaming data pipeline for communication with asynchronous event processing services, an indication of user identification data and an indication of a data source;
transferring said indication of user identification data and said indication of a data source to memory using a bus within the server;
determining, based on the indication of the data source and retrieval of information related to the data source from a memory within a database server, an inquiry rule, wherein the inquiry rule defines an inquiry threshold indicative of a maximum number of inquiries to be posed to the user;
comparing, with the server, an inquiry count to the inquiry threshold, wherein the inquiry count is indicative of a number of inquiries that have been posed to the user; and
if the inquiry count is less than the inquiry threshold, sending, using the server, an inquiry for the user to the data source, wherein sending the inquiry for the user comprises:
receiving a plurality of indications of expected utility of an inquiry, wherein one of the plurality of indications of expected utility is calculated by an event processing service based on the utility of an inquiry response, the probability that the user will respond to the inquiry, the user's expected response to the inquiry, and utility sharing percentage,
comparing, using the server, the plurality of indications of expected utility,
transmitting to a remote server a verification request, wherein the verification request includes at least a portion of the indication of user identification data,
receiving a response to the verification request from the remote server,
wherein if the response to the verification request is received within 500 milliseconds and is positive, the inquiry is not suppressed,
wherein if the response to the verification request is not received within 500 milliseconds or is negative, the inquiry is suppressed,
and
if the inquiry is not suppressed, based on the comparing the plurality of indications of expected utility, transmitting with the server an inquiry to the data source, wherein the transmitting occurs within one second of the receiving the indication of user identification data and the indication of the data source.

16. The medium of claim 15, storing further instructions that cause a system comprising a processor to perform operations, comprising:
incrementing, with the server, the inquiry count;
if the incremented inquiry count is less than or equal to the inquiry threshold, repeating the step of sending an inquiry; and
if the incremented inquiry count is greater than the inquiry threshold, transmitting an indication of no further inquiries to the data source.

17. The medium of claim 15, wherein the inquiry comprises a question for the user to answer or an advertisement for the user to view.

18. The medium of claim 15, storing further instructions that cause a system comprising a processor to perform operations, comprising:
calculating a difference between the inquiry count and the inquiry threshold; and
if the difference is greater than or equal to a drop-off threshold, determining that the inquiry comprises a question for the user to answer, and
if the difference is less than a drop-off threshold, determining that the inquiry may comprise a question for the user to answer or an advertisement for the user to view.

19. The medium of claim 16, wherein the user's expected response to the inquiry is based on past responses to the inquiry by a plurality of prior users.

20. The medium of claim 17, wherein
the plurality of indications of expected utility comprises an expected drop-off rate based on the rate at which a plurality of prior users discontinued responding to inquiries.

\* \* \* \* \*